(12) United States Patent
Kawamoto et al.

(10) Patent No.: US 9,487,088 B2
(45) Date of Patent: Nov. 8, 2016

(54) IN-VEHICLE APPARATUS MOUNTING UNIT

(71) Applicants: KABUSHIKI KAISHA TOYOTA JIDOSHOKKI, Kariya-shi, Aichi (JP); KABUSHIKI KAISHA TOKAI RIKA DENKI SEISAKUSHO, Niwa-gun, Aichi (JP)

(72) Inventors: Yuji Kawamoto, Kariya (JP); Koji Ozeki, Niwa-gun (JP); Shigeo Shigeyama, Toyota (JP)

(73) Assignees: KABUSHIKI KAISHA TOYOTA JIDOSHOKKI, Aichi (JP); KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 78 days.

(21) Appl. No.: 14/404,141

(22) PCT Filed: May 14, 2013

(86) PCT No.: PCT/JP2013/063412
§ 371 (c)(1),
(2) Date: Nov. 26, 2014

(87) PCT Pub. No.: WO2013/179889
PCT Pub. Date: Dec. 5, 2013

(65) Prior Publication Data
US 2015/0165908 A1    Jun. 18, 2015

(30) Foreign Application Priority Data
Jun. 1, 2012   (JP) .................................. 2012-125945

(51) Int. Cl.
*B60K 37/02*   (2006.01)
*B60H 1/00*    (2006.01)

(52) U.S. Cl.
CPC ............. *B60K 37/02* (2013.01); *B60H 1/0065* (2013.01); *B60K 2350/102* (2013.01); *B60K 2350/941* (2013.01)

(58) Field of Classification Search
CPC .......................... B60K 37/02; B60H 1/0065
USPC ............................................... 296/70, 187.05
See application file for complete search history.

(56) References Cited

U.S. PATENT DOCUMENTS

| 4,051,916 A | 10/1977 | Oda |
| 6,854,783 B2 * | 2/2005 | Teranishi ............... B60K 37/00 296/37.12 |

(Continued)

FOREIGN PATENT DOCUMENTS

| EP | 1 666 312 A1 | 6/2006 |
| JP | 53-164672 U | 12/1973 |

(Continued)

OTHER PUBLICATIONS

International Search Report of PCT/JP2013/063412 dated Jul. 23, 2013.

(Continued)

*Primary Examiner* — Joseph D Pape
(74) *Attorney, Agent, or Firm* — Sughrue Mion, PLLC

(57) ABSTRACT

An in-vehicle apparatus mounting unit having a projection projecting into a cabin interior includes: a panel provided to face the cabin interior; a support for supporting the projection while the projection is made to project from the panel; and a support case that is attached to the panel on an opposite side to the cabin and accommodates the support in a space formed thereby together with the panel. The support is fixed to the panel or the support case by fixing means, and the fixing means releases the fixation for the support when a load pushing the projection toward the panel exceeds a predetermined load.

6 Claims, 7 Drawing Sheets

(56) References Cited

U.S. PATENT DOCUMENTS

2006/0186689 A1* 8/2006 Gresham ............... B60K 37/00
                                                    296/70
2009/0015031 A1* 1/2009 Sato ..................... B60K 37/00
                                                    296/70

FOREIGN PATENT DOCUMENTS

| JP | 2000-190790 A | 7/2000 |
| JP | 2003-11744 A | 1/2003 |
| JP | 2004-136840 A | 5/2004 |
| JP | 2005-5515 A | 1/2005 |
| JP | 2006-151186 A | 6/2006 |
| JP | 2006-160028 A | 6/2006 |
| JP | 2008-137476 A | 6/2008 |
| JP | 2010-047234 A | 3/2010 |
| KR | 10-2009-0106703 A | 10/2009 |

OTHER PUBLICATIONS

Communication dated Apr. 28, 2016 from the State Intellectual Property Office of the P.R.C. in counterpart Application No. 201380027636.9.

Communication dated Sep. 13, 2016 from the Japanese Patent Office in counterpart application No. 2012-125945.

* cited by examiner

IN-VEHICLE APPARATUS MOUNTING UNIT

CROSS REFERENCE TO RELATED APPLICATIONS

This is a National Stage of International Application No. PCT/JP2013/063412 filed May 14, 2013, claiming priority based on Japanese Patent Application No. 2012-125945 filed Jun. 1, 2012, the contents of all of which are incorporated herein by reference in their entirety.

TECHNICAL FIELD

The present invention relates to an in-vehicle apparatus mounting unit, and more particularly to a mounting unit for mounting an in-vehicle apparatus to a cabin interior of a vehicle such as an automobile.

BACKGROUND ART

For example, operation panels for operating car audios, car air-conditioners, etc., as in-vehicle apparatuses are disposed on an instrument panel located at the front of the cabin of an automobile. Dial type switches are often employed on the operation panels to adjust volume, temperature, and so on. In order to improve operability, the dial type switches project quite a bit from the front surfaces of the operation panels.

However, when an automobile is involved in a collision or when there is sudden braking, there is a danger that the head of a passenger swinging greatly to the front and rear will strike the instrument panel. Hence, the dial type switches projecting quite a bit from the operation panels are designed to withdraw into the back side of the instrument panel when the head of the passenger strikes the panel with at least a predetermined force, and as a result, injury to the head of the passenger is reduced.

Patent Document 1, for example, describes a mounting structure in which mounting portions are provided on the lateral sides of the case body of an in-vehicle apparatus such as a heater controller having switches on the front surface thereof, and the mounting portions are fixed to the instrument panel. V slits are formed on the members of the mounting portions which are coupled to the case body and support the case body. Hence, when at least a predetermined load acts on the heater controller, the members of the mounting portion having the V slits are broken such that the case body of the heater controller is pushed into the interior of the console box which is located on the back side of the instrument panel, and as a result, an impact generated by the load is absorbed.

PRIOR ART DOCUMENT

Patent Document

Patent Document 1: Japanese Patent Application Laid Open No. 2000-190790

SUMMARY OF THE INVENTION

Problem to be Solved by the Invention

In the mounting structure described in Patent Document 1, the mounting portions are provided on the outer lateral side of the case main body of the heater controller via the members which have the V slits and are located between the lateral sides and the mounting portions. Therefore the mounting structure laterally increases in size. Further, the fixtures for fixing the mounting structure to the instrument panel must be provided on the immobile mounting portions, and therefore the fixtures are provided on the outer edge areas of the mounting portions, leading to a further increase in the size of the mounting structure. As a result, the design panel of the heater controller, which is attached to the mounting portions and the case body and disposed on the instrument panel, also increases in size. The increased size of the design panel may generate a problem that design limitations are placed on the instrument panel. Furthermore, when at least a predetermined load acts on the heater controller such that the mounting portions are broken at the V slits, the case body that is pushed toward the back side of the instrument panel may collide with the instruments in the console box, causing the instruments to break. Therefore, in order to reduce the impact generated by a collision of the case body, a large space must be secured on the back side of the case body.

The present invention was conceived to solve the above problems, and an object of the present invention is to provide an in-vehicle apparatus mounting unit with which a reduction in size and space saving can be achieved.

Means for Solving the Problem

To solve the problems described above, an in-vehicle apparatus mounting unit according to the present invention, which has a projection that projects into a cabin interior, includes: a panel provided to face the cabin interior; a support for supporting the projection while the projection is made to project into the cabin interior from the panel; and a support case that is attached to the panel on an opposite side to the cabin and accommodates the support in a space formed thereby together with the panel, wherein the support is fixed to the panel or the support case by fixing means, and the fixing means releases the fixation for the support when a load pushing the projection toward the panel exceeds a predetermined load.

Advantageous Effect of the Invention

The in-vehicle apparatus mounting unit according to the present invention can achieve a size reduction and space saving of the structure thereof.

MODE FOR CARRYING OUT THE INVENTION

An embodiment of the present invention will be described below on the basis of the accompanying drawings.
—Embodiment First, a configuration of an in-vehicle apparatus mounting unit 101 according to this embodiment of the present invention will be described. Note that the in-vehicle apparatus mounting unit according to the embodiment described below constitutes a heater control panel of a vehicle such as a passenger car.

Figure 1:
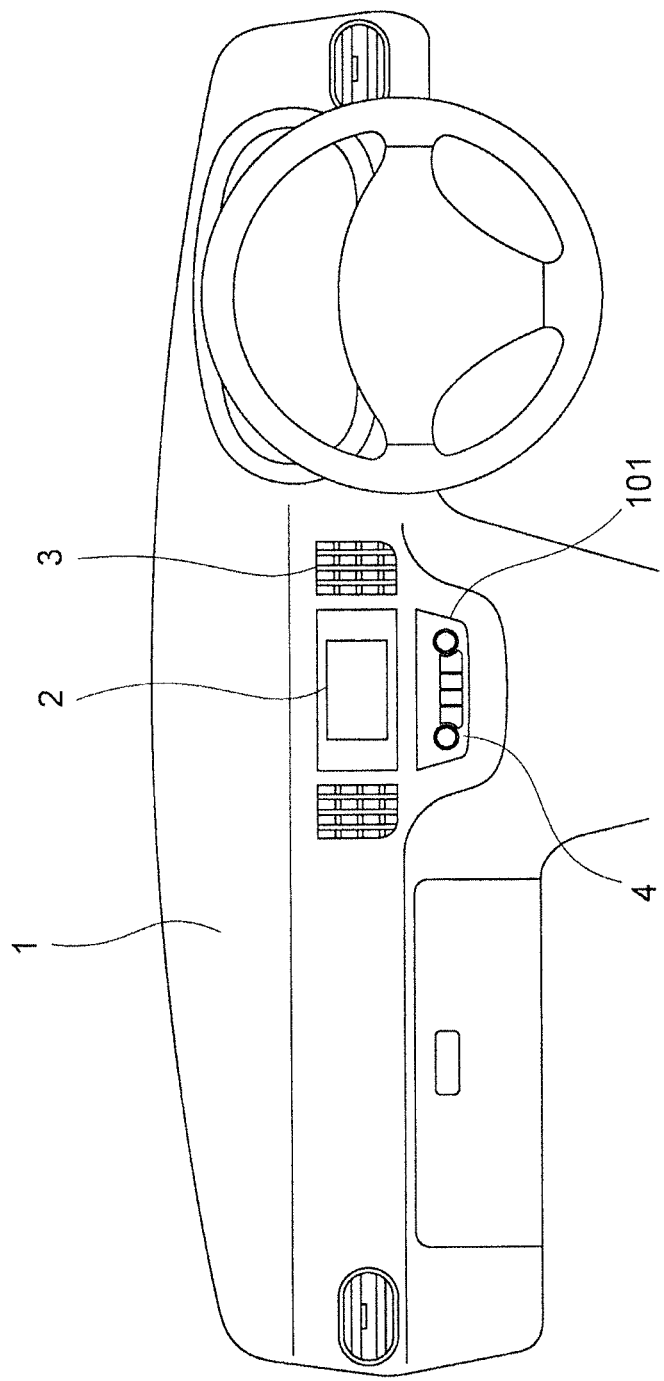
FIG. 1 is a schematic diagram showing an area of and around an instrument panel installed with an in-vehicle apparatus mounting unit according to an embodiment of the present invention.

Referring to FIG. 1, a car navigation monitor 2, air-conditioning air outlets 3 of an air conditioner, and an operating portion of the air conditioner, or in other words a heater control panel 4, are embedded on the center in an instrument panel 1 located in front of the driver's seat of a vehicle such as a passenger car. A switch for switching operating modes of the air conditioner, a switch for selecting air outlets of the air-conditioning air from the air conditioner, a switch for setting the air-conditioning temperature of the air conditioner, and so on are provided on the front surface of the heater control panel 4.

Further, the heater control panel 4 comprises the in-vehicle apparatus mounting unit 101, which is a single unit embedded in the instrument panel 1.

Figure 2:
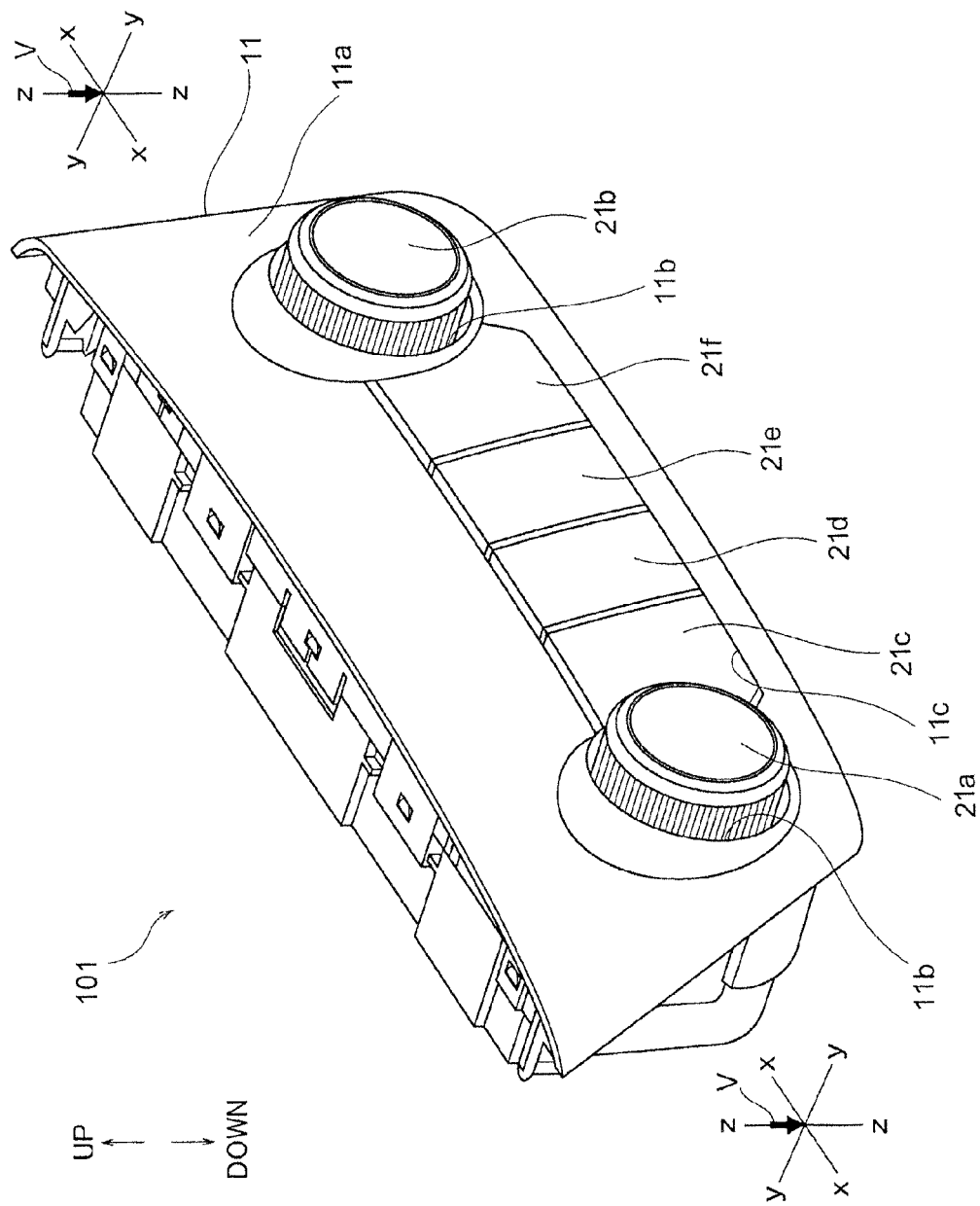
FIG. 2 is a perspective view of the in-vehicle apparatus mounting unit according to this embodiment of the present invention.
Figure 3:
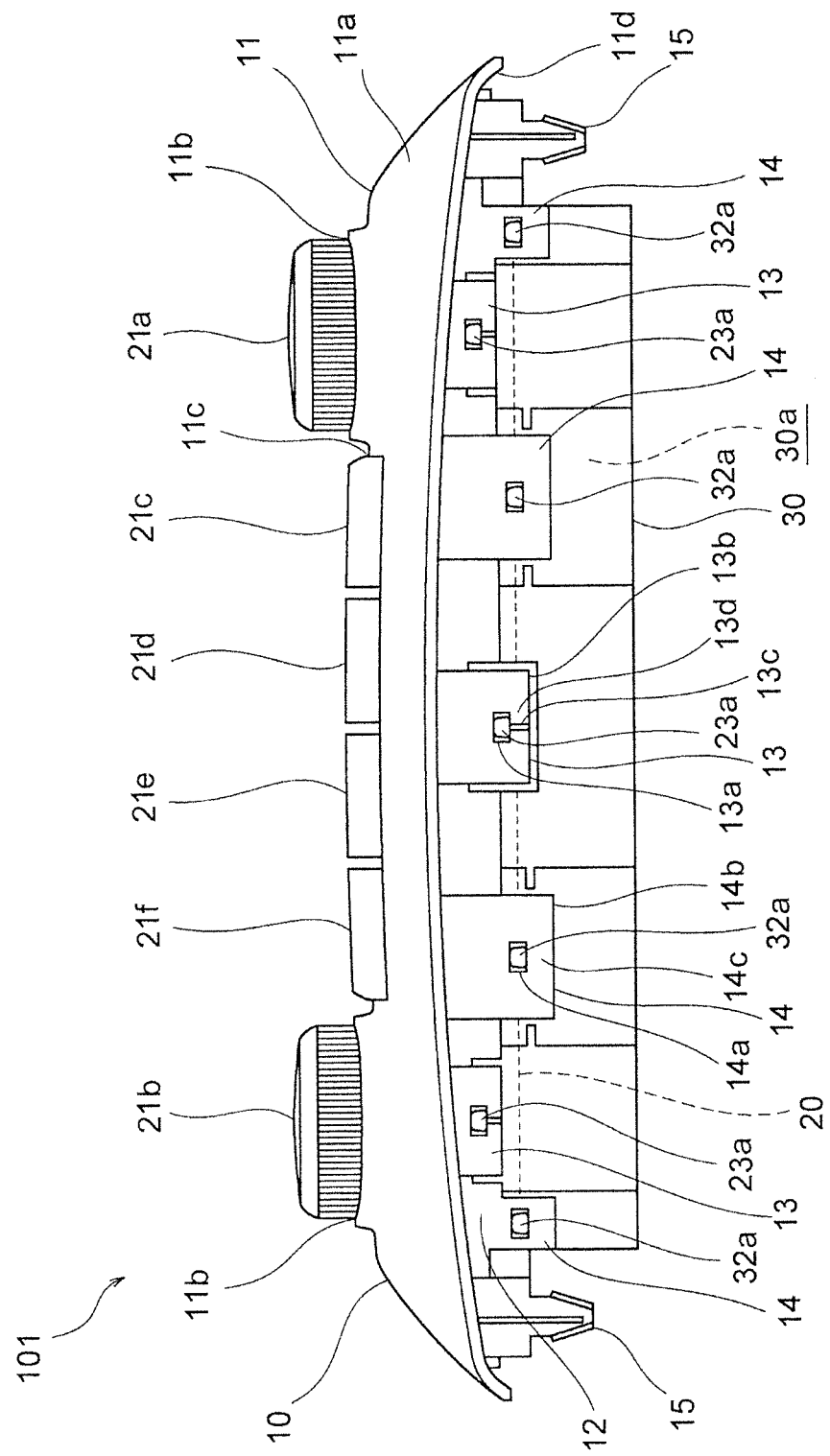
FIG. 3 is a plan view showing the in-vehicle apparatus mounting unit of FIG. 2 from above.

Here, FIG. 2 is a perspective view showing the in-vehicle apparatus mounting unit 101 from the side on which the respective switches are provided, and FIG. 3 is a plan view showing the in-vehicle apparatus mounting unit 101 of FIG. 2 from above.

Referring to FIGS. 2 and 3 together, the in-vehicle apparatus mounting unit 101 has a boxlike configuration, and includes a design panel portion 11 that is exposed toward the driver's seat and defines a design surface 11a when the in-vehicle apparatus mounting unit 101 is embedded in the instrument panel 1 (see FIG. 1). Further, on the in-vehicle apparatus mounting unit 101, a cylindrical dial type temperature adjustment switch 21a for setting the air-conditioning temperature of the air conditioner and a cylindrical dial type air volume adjustment switch 21b for adjusting the volume of the air-conditioning air blown out from the air conditioner project by a large amount from the design panel portion 11 toward the driver's seat through two switch openings 11b formed in the vicinity of respective ends of the design panel portion 11. Furthermore, on the in-vehicle apparatus mounting unit 101, a plurality of push-button type switches 21c to 21f such as a switch for switching the operating modes are provided between the temperature adjustment switch 21a and the air volume adjustment switch 21b so as to project from the design panel portion 11 toward the driver's seat through a switch opening 11c formed in the design panel portion 11. In this construction, the push-button type switches 21c to 21f project by a much smaller amount than the temperature adjustment switch 21a and the air volume adjustment switch 21b. Here, the temperature adjustment switch 21a and the air volume adjustment switch 21b constitute a projection, while the switches 21a to 21f constitute an in-vehicle apparatus.

Further, the in-vehicle apparatus mounting unit 101 includes an electronic substrate therein which is not shown in the drawings and is electrically connected to the respective switches 21a to 21f to transmit signals from the switches 21a to 21f to a control unit of the in-vehicle air conditioner.

Note that the in-vehicle apparatus mounting unit 101 is installed in the instrument panel 1 (see FIG. 1) such that an upper side thereof is oriented upward as seen in FIG. 2.

Figure 4:
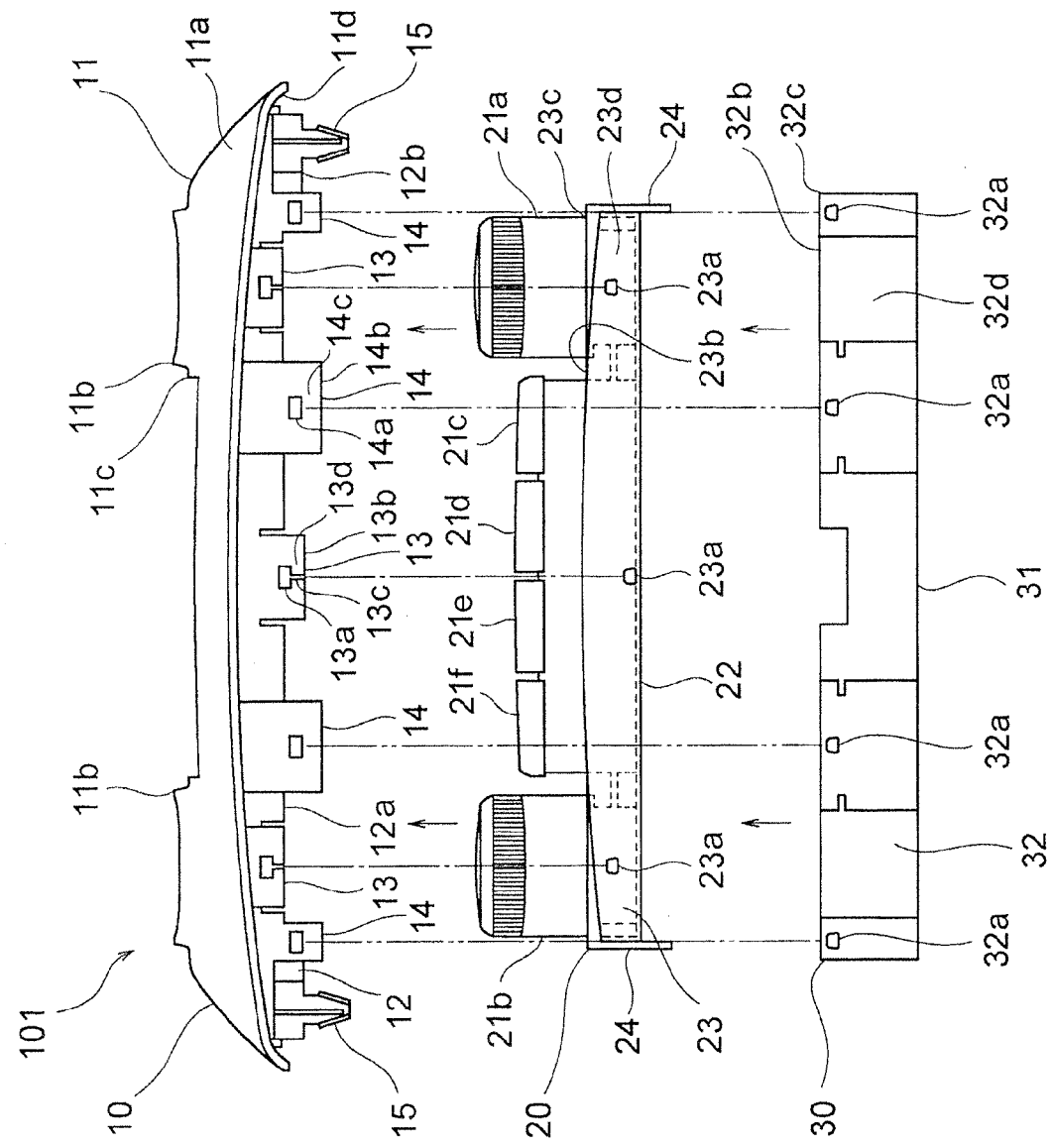
FIG. 4 is an exploded view of the in-vehicle apparatus mounting unit of FIG. 3.

Referring to FIG. 3 in combination with FIG. 4, which is an exploded plan view of the in-vehicle apparatus mounting unit 101 shown in FIG. 3, the in-vehicle apparatus mounting unit 101 includes a resin cluster panel 10 where the design panel portion 11 is integrated, a resin front case 20 that includes in its interior and supports the switches 21a to 21f and the electronic substrate electrically connected thereto, and a resin rear case 30 that includes the front case 20 in its interior. The front case 20 and the rear case 30 are configured so as to be assembled to the cluster panel 10. Here, the front case 20 constitutes a support, and the rear case 30 constitutes a support case.

The cluster panel 10 includes a rectangular cylinder-shaped cylindrical portion 12. The cylindrical portion 12 projects in a direction opposite to the projection direction of the switches 21a to 21f from a back surface 11d of the design panel portion 11, which is a surface on the opposite side to the design surface 11a located on the side where the switches 21a to 21f project.

The cylindrical portion 12 is formed integrally with the design panel portion 11. The cylindrical portion 12 takes the shape of a bottomed rectangular cylinder, where one end is closed by a bottom constituted by the design panel portion 11 and an end 12a on the opposite side to the design panel portion 11 is open so as to form a rectangular opening 12b. Further, the cylindrical portion 12 and the opening 12b are formed to be large enough to accommodate the switches 21a to 21f therein.

Arrowhead-shaped fixing pins 15 are formed integrally with the design panel portion 11 adjacent to the outer side of the cylindrical portion 12. The fixing pins 15 project from the back surface 11d of the design panel portion 11 in the projection direction of the cylindrical portion 12. By inserting each fixing pin 15 into a boss, which is not shown in the drawings and is provided on the instrument panel 1 (see FIG. 1), and engaging the fixing pin 15 with the boss, the cluster panel 10 assembled with the front case 20 and the rear case 30 is fixed to the instrument panel 1.

Pluralities of plate-shaped first fixing members 13 and second fixing members 14 are formed integrally with the cylindrical portion 12 in the vicinity of the opening 12b in the cylindrical portion 12 and around the periphery of the opening 12b.

The second fixing members 14 project from the opening 12b in the direction opposite to the design panel portion 11. Further, rectangular second engagement holes 14a are formed respectively in the second fixing members 14 so as to penetrate the second fixing members 14. Peripheral edges of the respective second engagement holes 14a are surrounded by the second fixing members 14. Moreover, the second engagement holes 14a can be engaged with a plurality of second engagement projections 32a formed on the rear case 30. Here, the second engagement holes 14a and the second engagement projections 32a constitute case fixing means.

The first fixing members 13 are formed in the vicinity of the opening 12b, and do not project as far as the second fixing members 14. Further, rectangular first engagement holes 13a are formed respectively in the first fixing members 13 so as to penetrate the first fixing members 13. Furthermore, a slit 13c (see FIG. 6) is formed in each first fixing member 13 so as to extend from the peripheral edge of the first engagement hole 13a to a tip end 13b of the first fixing member 13 which is located on the opposite side to the design panel portion 11. The slit 13c penetrates the first fixing member 13 in a penetration direction of the first engagement hole 13a so that a gap is formed in the first fixing member 13. Hence, a part of the first engagement hole 13a, which is located on the tip end 13b side, is not closed by the first fixing member 13. The first engagement holes 13a can be engaged with first engagement projections 23a formed on the front case 20. Moreover, the first fixing members 13 are formed so as to be positioned more inside than the second fixing members 14 in the cylindrical portion 12. Here, the first engagement holes 13a and the first engagement projections 23a constitute fixing means.

The front case 20 includes a rectangular plate-shaped bottom portion 22 and a rectangular cylinder-shaped side portion 23 extending from the bottom portion 22 around the peripheral edge of the bottom portion 22. The bottom portion 22 and side portion 23 are formed integrally in the shape of a bottomed rectangular cylinder. The switches 21a to 21f and the electronic substrate, not shown in the drawings, are disposed inside the bottom portion 22 and the side portion 23 of the front case 20 and are fixed to the bottom portion 22. The switches 21a to 21f attached to the front case 20 respectively project to the outside of the side portion 23 through an opening 23c defined by an end 23b of the side portion 23.

A plurality of guide members 24 are formed integrally with the front case 20 on an outer surface 23d surrounding the outer periphery of the side portion 23. Note that in FIGS. 4 and 5, the guide members 24 are provided in mutually opposing positions on either side of the side portion 23, but the guide members 24 may be provided on the front side and the back side of the side portion 23 in the figure. The guide members 24 are formed in a strip shape so as to project from the outer surface 23d in an outward direction perpendicular to the outer surface 23d and extend in a direction from the switches 21a to 21f toward the bottom portion 22. The guide members 24 extend from the end 23b of the side portion 23 beyond the bottom portion 22.

Moreover, the plurality of first engagement projections 23a are formed integrally with the outer surface 23d of the side portion 23. The first engagement projections 23a are formed in positions that align respectively with the first engagement holes 13a in the first fixing members 13 when the front case 20 is incorporated into the cluster panel 10.

Hence, the front case 20 is incorporated into the cluster panel 10 by inserting the switches 21a to 21f into the cylindrical portion 12 through the opening 12b, causing the switches 21a to 21f to project to the outside through the switch openings 11b and 11c in the design panel portion 11, and inserting the side portion 23 inside the cylindrical portion 12. During this insertion process, the first engagement projections 23a of the side portion 23 pass on the inside of the first fixing members 13 via the tip end 13b, and are then snap-fitted with the first engagement holes 13a. As a result, the front case 20 is fixed to the cluster panel 10. In this construction, the switches 21a to 21f and the electronic substrate thereof are completely covered by the cluster panel 10 and the front case 20 on the back surface 11d side of the design panel portion 11 of the cluster panel 10 (see FIG. 5).

Figure 6:
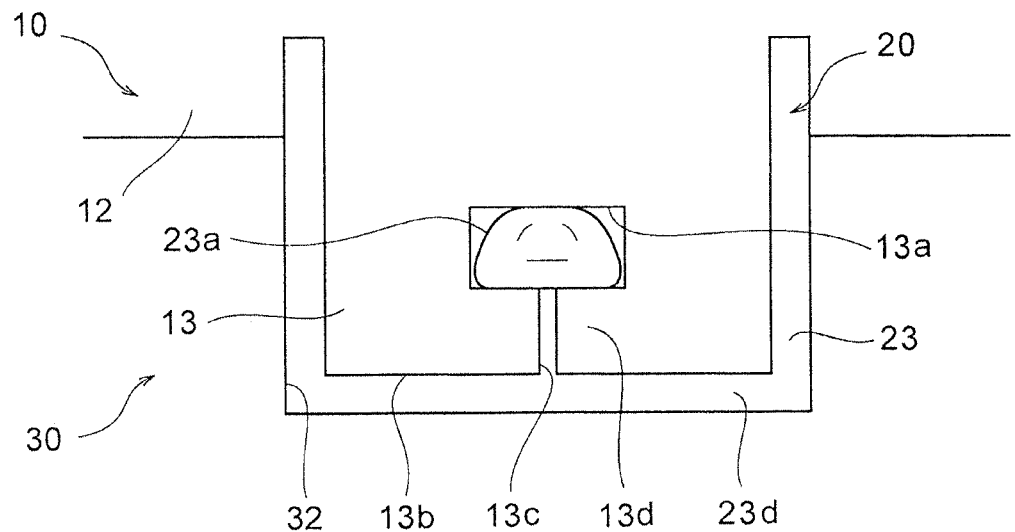
FIG. 6 is an enlarged plan view of a first fixing member of a cluster panel and a first engagement projection of a front case shown in FIG. 2.

As shown in FIG. 6, the first engagement projections 23a are formed in the shape of a halved truncated cone. The first engagement projections 23a are formed in a projecting shape including an inclination, where, when the front case 20 is incorporated into the cluster panel 10, respective parts of the first engagement projections 23a on the tip end 13b side of the first fixing members 13 project by a larger amount substantially perpendicular to the outer surface 23d of the side portion 23 and the amount of projection gradually decreases toward the opposite side to the tip ends 13b. As a result, the first engagement projections 23a on the front case 20 are engaged easily with the first engagement holes 13a in the cluster panel 10. Following engagement, however, the first engagement projections 23a are deeply engaged with first engagement support portions 13d, which are parts between the tip ends 13b and the first engagement holes 13a in the respective first fixing members 13, and therefore the first engagement projections 23a are unlikely to be disengaged from the first engagement holes 13a even when pushed in a direction toward the tip ends 13b.

Referring again to FIGS. 3 and 4, the rear case 30 includes a rectangular plate-shaped bottom portion 31 and a rectangular cylinder-shaped side portion 32 extending from the bottom portion 31 around the peripheral edge of the bottom portion 31. The bottom portion 31 and side portion 32 are formed integrally in the shape of a bottomed rectangular cylinder. The bottom portion 31 and the side portion 32 are respectively formed to be large enough to cover the bottom portion 22 and the side portion 23 of the front case 20 from the outside. Further, the side portion 32 is shaped such that an end 32b of the side portion 32 is abutted and fitted to the end 12a of the cylindrical portion 12 of the cluster panel 10. The plurality of second engagement projections 32a are formed integrally with an outer surface 32d surrounding the outer periphery of the side portion 32. The second engagement projections 32a are formed in positions that align respectively with the second engagement holes 14a in the second fixing members 14 when the rear case 30 is incorporated with the cluster panel 10.

Hence, the rear case 30 is incorporated with the cluster panel 10 incorporated with the front case 20 by inserting the front case 20 into an opening 32c, which is defined by the end 32b of the side portion 32 of the rear case 30, from the bottom portion 22 of the front case 20. During this insertion process, the side portion 32 and the second engagement projections 32a in the rear case 30 pass on the inside of the second fixing members 14 via the tip ends 14b of the second fixing members 14, and the second engagement projections 32a are then snap-fitted with the second engagement holes 14a. As a result, the rear case 30 is fixed to the cluster panel 10. Also, the end 32b of the side portion 32 of the rear case 30 is abutted and fitted to the end 12a of the cylindrical portion 12 of the cluster panel 10. In this construction, a closed space 30a is formed on the back surface 11d side of the design panel portion 11 of the cluster panel 10 by the cluster panel 10 and the rear case 30, and the front case 20 is completely covered by the cluster panel 10 and the rear case 30 within the space 30a (see FIG. 5).

The second engagement projections 32a, similarly to the first engagement projections 23a of the front case 20, are formed in the shape of a halved truncated cone. The second engagement projections 32a are formed in a projecting shape including an inclination, where, when the rear case 30 is incorporated with the cluster panel 10, respective parts of the second engagement projections 32a on the tip end 14b side of the second fixing members 14 project by a larger amount substantially perpendicular to the outer surface 32d of the side portion 32 and the amount of projection gradually decreases toward the opposite side. As a result, the second engagement projections 32a on the rear case 30 are engaged easily with the second engagement holes 14a in the cluster panel 10. Following engagement, however, the second engagement projections 32a are deeply engaged with second engagement support portions 14c, which are parts between the tip ends 14b and the second engagement holes 14a in the respective second fixing members 14, and therefore the second engagement projections 32a are unlikely to be disengaged from the second engagement holes 14a even when pushed in a direction toward the tip ends 14b.

Referring also to FIG. 6, in the second fixing members 14 of the cluster panel 10, the second engagement support portions 14c have a continuously extending structure, whereas in the first fixing members 13, the first engagement support portions 13d are divided into two on a substantially central position of the first engagement hole 13a by the slits 13c. Therefore, the first engagement support portions 13d are weaker than the second engagement support portions 14c. Accordingly, when the first engagement projections 23a and the second engagement projections 32a are pushed respectively against the first engagement support portions 13d and the second engagement support portions 14c, the first engagement support portions 13d deform or break under a lower pushing force, causing the first engagement holes 13a to expand or open. As a result, the engagement of the first engagement projections 23a with the first engagement support portions 13d is released such that the first engagement projections 23a become detached from the first engagement holes 13a.

Figure 5:
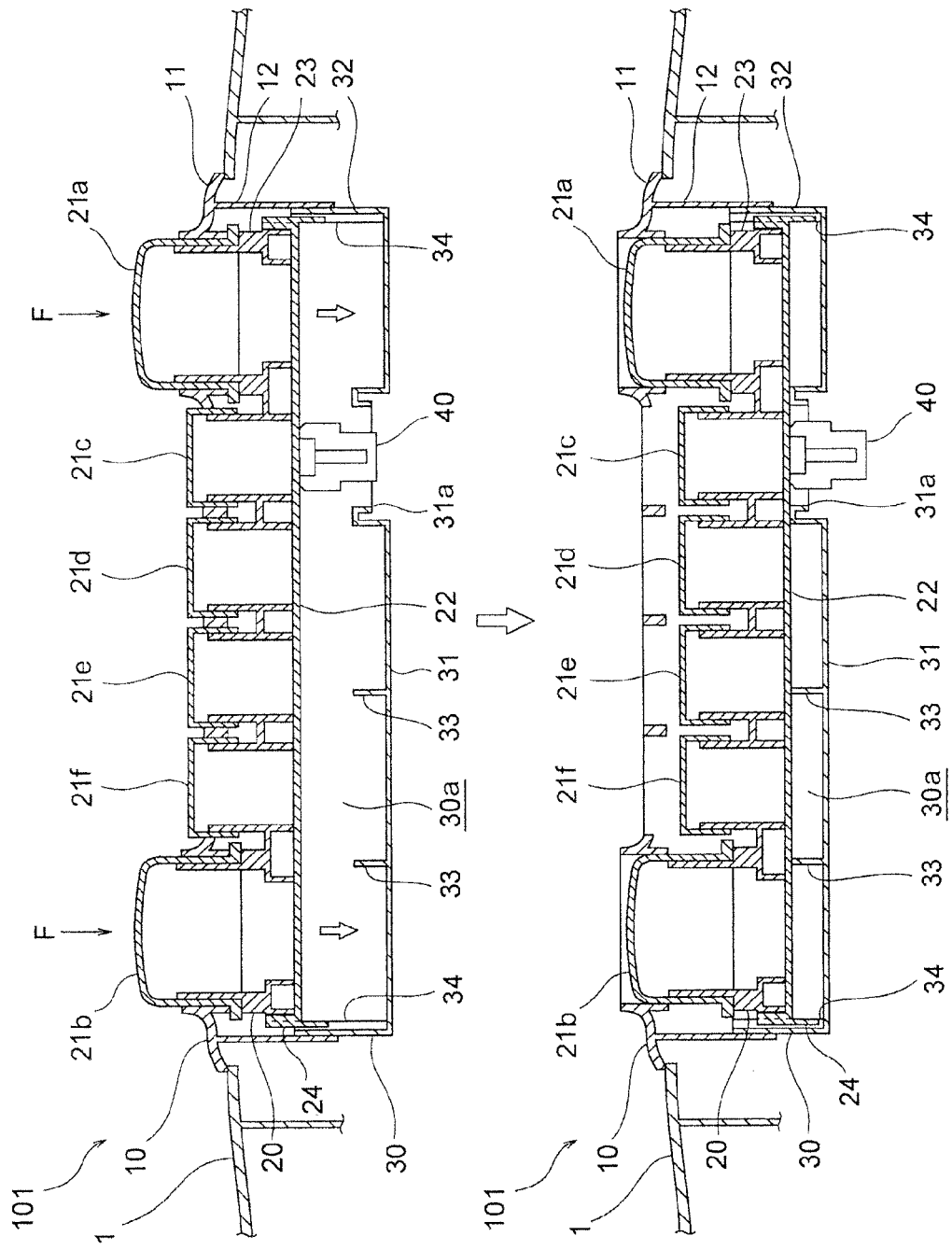
FIG. 5 is a sectional view showing a cross-section that includes line x-x and line y-y in FIG. 2 in vertical direction V extending along line z-z.

FIG. 5 shows a cross-section of the cluster panel 10 which is incorporated with the front case 20 and the rear case 30 and is installed in the instrument panel 1, or in other words the in-vehicle apparatus mounting unit 101 which is installed in the instrument panel 1. Further, FIG. 5 is a view where a cross-section of the in-vehicle apparatus mounting unit 101 in FIG. 2, which includes axis x-x extending in a direction from the central axis of the cylindrical temperature adjustment switch 21a toward the central axis of the cylindrical air volume adjustment switch 21b and axis y-y extending in the direction along the respective central axes of the temperature adjustment switch 21a and the air volume adjustment switch 21b, is seen in a direction from above (direction V) along axis z-z that is perpendicular to axis x-x and axis y-y.

Referring to FIG. 5, a connector opening 31a is formed in the bottom portion 31 of the rear case 30. Further, in a condition where the front case 20 and the rear case 30 are incorporated with the cluster panel 10, a connector 40 attached to the outer side of the bottom portion 22 of the front case 20 extends out through the connector opening 31a.

The connector 40 is electrically connected to the electronic substrate which is not shown in the drawings and is provided in the interior of the front case 20. The connector 40 of the front case 20 is configured to be connected to a connector of a cable that extends from a control unit of the vehicle. Thus, information input into the respective switches 21a to 21f is converted into signals by the electronic substrate, transmitted to the control unit via the connector 40 and the cable, and reflected in control of the air conditioner.

Further, a plurality of stoppers 33 are formed integrally on the inner side of the bottom portion 31 of the rear case 30. In a condition where the front case 20 and the rear case 30 are incorporated with the cluster panel 10, the stoppers 33 project toward the bottom portion 22 of the front case 20.

Furthermore, guide frames 34 for supporting the respective guide members 24 of the front case 20 are formed integrally on the inner side of the side portion 32 of the rear case 30. The guide frames 34 are formed such that groove-shaped cross-sections, which are formed by reducing a member wall thickness of the side portion 32 of the rear case 30 in the direction where the respective guide members 24 project from the outer surface 23d (see FIG. 4), are extended from the opening 32c (see FIG. 4) formed by the end 32b (see FIG. 4) of the side portion 32 of the rear case 30 to the bottom portion 31. In FIG. 5, for example, the groove-shaped guide frames 34 formed on the front side and back side in the figure extend from the front case 20 toward the bottom portion 31 of the rear case 30 in relation to the respective guide members 24 which are disposed on the side portion 32 so as to project from the front side and back side in the figure. The guide members 24 are positioned within the groove-shaped parts of the guide frames 34. Hence, by engaging the guide frames 34 with the guide members 24 on the insides thereof, movement of the front case 20 from the cluster panel 10 toward the rear case 30 is guided so as to achieve parallel movement. Here, the guide frames 34 constitute a guide.

Next, an action of the in-vehicle apparatus mounting unit 101 according to this embodiment of the present invention will be described.

Referring to FIGS. 3 and 5 together, when the vehicle is involved in a collision or sudden braking so that the head of a passenger is caused to swing greatly, the head may strike at least one of the temperature adjustment switch 21a and the air volume adjustment switch 21b which project by the largest amount from the cluster panel 10.

On this occasion, force F acting on the temperature adjustment switch 21a and the air volume adjustment switch 21b pushes the front case 20 toward the rear case 30 via the temperature adjustment switch 21a and the air volume adjustment switch 21b. As a result, a pushing force from the first engagement projections 23a of the front case 20 acts on the first engagement support portions 13d of the first fixing members 13 of the cluster panel 10 toward the tip ends 13b.

When this pushing force exceeds a predetermined load, or in other words when force F increases beyond a predetermined amount, the first engagement support portions 13d of the first fixing members 13 are deformed or broken, causing the first engagement holes 13a to expand or open, and as a result, the first engagement projections 23a become detached from the first engagement holes 13a. Furthermore, while the guide members 24 of the front case 20 are guided by the guide frames 34 of the rear case 30, the front case 20 is moved substantially parallel through the space 30a toward the rear case 30. The front case 20 stops moving when the bottom portion 22 thereof abuts the stoppers 33 of the rear case 30. Hence, the greatly projecting temperature adjustment switch 21a and air volume adjustment switch 21b sink into the space 30a surrounded by the cluster panel 10 and the rear case 30 together with the other switches 21c to 21f, thereby absorbing the impact of the head of the passenger, and as a result, injury to the head is reduced.

Note that the second engagement support portions 14c of the second fixing members 14 of the cluster panel 10 are stronger than the first engagement support portions 13d of the first fixing members 13, and therefore, when a force F exceeding the predetermined amount is applied, the fixing between the cluster panel 10 and the front case 20 can be released before the fixing between the cluster panel 10 and the rear case 30. Furthermore, the second engagement support portions 14c of the second fixing members 14 of the cluster panel 10 have high strength and impact energy generated by a head strike is absorbed when the first engagement support portions 13d deform and break. Hence, when the moving front case 20 detached from the cluster panel 10 collides with the rear case 30, the second engagement support portions 14c are not deformed or broken, and therefore the rear case 30 does not become detached from the cluster panel 10. As a result, a situation where the rear case 30 becomes detached to collide with and damage an instrument located at the back thereof (on the opposite side to the cluster panel 10) is prevented.

As described above, the in-vehicle apparatus mounting unit 101 according to the present invention includes a projection (the temperature adjustment switch 21a and the air volume adjustment switch 21b) that projects into the cabin interior. Further, the in-vehicle apparatus mounting unit 101 includes: the cluster panel 10 provided to face the cabin interior; the front case 20 that supports the temperature adjustment switch 21a and the air volume adjustment switch 21b while the temperature adjustment switch 21a and the air volume adjustment switch 21b are made to project into the cabin interior from the cluster panel 10; and the rear case 30 that is attached to the cluster panel 10 on the opposite side to the cabin and accommodates the front case 20 in the space 30a formed thereby together with the cluster panel 10. The front case 20 is fixed to the cluster panel 10 by the engagement between the first engagement projections 23a and the first engagement holes 13a. The engagement between the first engagement projections 23a and the first engagement holes 13a is released when a load that pushes the temperature adjustment switch 21a or the air volume adjustment switch 21b toward the cluster panel 10 exceeds a predetermined load.

In this construction, when the head of a passenger strikes the temperature adjustment switch 21a or the air volume adjustment switch 21b during a vehicle collision or the like such that a load exceeding the predetermined load acts on them, the engagement between the first engagement projections 23a and the first engagement holes 13a is released such that the front case 20 is moved through the space 30a toward the rear case 30. As a result, the projecting switches 21a and 21b are withdrawn, thereby absorbing the impact of the head. In other words, the in-vehicle apparatus mounting unit 101 has a construction where, when an impact is generated, the front case 20 moves through the space 30a surrounded by the fixed, immobile cluster panel 10 and rear case 30. Accordingly, a space for installing the in-vehicle apparatus mounting unit 101 merely needs a space for accommodating the cluster panel 10 and the rear case 30, and therefore space saving can be achieved. Moreover, a fixing structure for fixing the in-vehicle apparatus mounting unit 101 to the instrument panel 1 or the like can be provided on either the cluster panel 10 or the rear case 30, and therefore a reduction in size can also be achieved.

In the in-vehicle apparatus mounting unit 101, the first engagement holes 13a in the first fixing members 13 of the cluster panel 10 include the slits 13c extending from the respective peripheral edges thereof. With the slits 13c, the strength of the first fixing members 13 is reduced around the first engagement holes 13a. As a result, the load for releasing the engagement between the first engagement projections 23a and the first engagement holes 13a can be controlled.

In the in-vehicle apparatus mounting unit 101, the guide frames 34 are provided in the rear case 30 to guide the movement of the front case 20 through the space 30a in the rear case 30. As a result, the front case 20 can move smoothly and in a predetermined direction through the space 30a without stopping from becoming caught on the cluster panel 10 or the rear case 30.

In the in-vehicle apparatus mounting unit 101, the front case 20 is fixed to the cluster panel 10. As a result, the front case 20 can be fixed close to the cluster panel 10, enabling a reduction in the size of the in-vehicle apparatus mounting unit 101 and an improvement in the assembly accuracy of the switches 21a to 21f disposed on the design surface 11a. Moreover, the load acting on the temperature adjustment switch 21a or the air volume adjustment switch 21b does not act directly on the fixing portion between the cluster panel 10 and the rear case 30, and therefore damage to the above fixing portion can be avoided, with the result that the rear case 30 becoming detached from the cluster panel 10 can be prevented.

In the in-vehicle apparatus mounting unit 101, an engagement strength between the first engagement projections 23a and the first engagement holes 13a for fixing the front case 20 to the cluster panel 10 is lower than an engagement strength between the second engagement projections 32a and the second engagement holes 14a for fixing the rear case 30 to the cluster panel 10. Therefore, when a load exceeding the predetermined load acts on the temperature adjustment switch 21a or the air volume adjustment switch 21b, the engagement between the first engagement projections 23a and the first engagement holes 13a can be released first, and the fixing between the rear case 30 and the cluster panel 10 can be maintained.

In the in-vehicle apparatus mounting unit 101 according to this embodiment, the strength of the first engagement support portions 13d in the first fixing members 13 of the cluster panel 10 is reduced by forming the slits 13c extending from the first engagement holes 13a to the tip ends 13b, with the result that the engagement strength of the first engagement projections 23a of the front case 20 relative to the first engagement holes 13a decreases. However, the present invention is not limited thereto.

Figure 7:
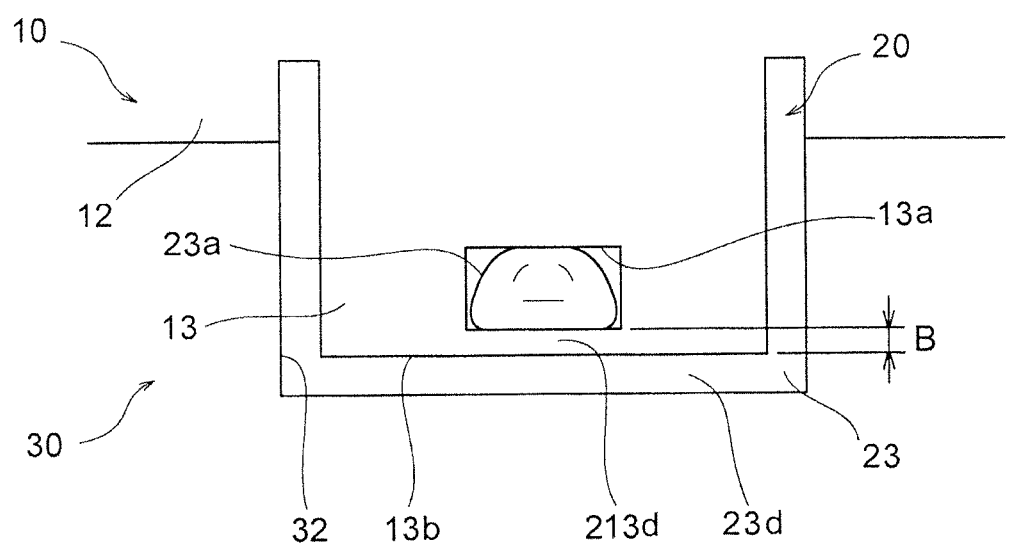
FIG. 7 is a plan view showing a modified example of the first fixing member of the cluster panel and the first engagement projection of the front case shown in FIG. 6.

As shown in FIG. 7, instead of forming the slit 13c in the first fixing member 13 of the cluster panel 10, distance B between the first engagement hole 13a and the tip end 13b of the first fixing member 13, or in other words width B of a first engagement support portion 213d may be shorter than the width of the first engagement support portion 13d shown in FIG. 6, and therefore the strength of the first engagement support portion 213d may be controlled to a lower level. In this construction, the first engagement support portion 213d is deformed or broken when pushed toward the tip end 13b of the first fixing member 13 by the first engagement projection 23a of the front case 20, and as a result, the engagement with the first engagement projection 23a is released.

Figure 8:
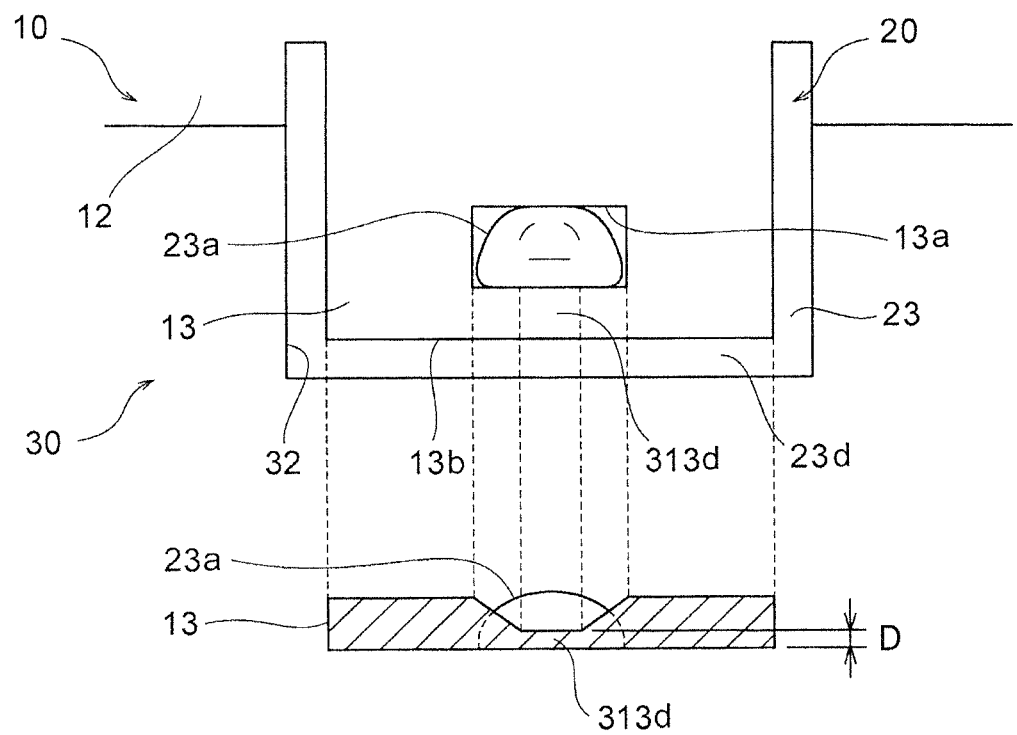
FIG. 8 shows a plan view and a sectional view thereof that show another modified example of the first fixing member of the cluster panel and the first engagement projection of the front case shown in FIG. 6.

As shown in FIG. 8, instead of forming the slit 13c in the first fixing member 13 of the cluster panel 10, thickness D (thickness in the projection direction of the first engagement projection 23a) of a first engagement support portion 313d between the first engagement hole 13a and the tip end 13b of the first fixing member 13 may be at least partially reduced, and therefore the strength of the first engagement support portion 313d may be controlled to a lower level. Likewise in this construction, the first engagement support portion 313d is deformed or broken when pushed toward the tip end 13b of the first fixing member 13 by the first engagement projection 23a of the front case 20, and as a result, the engagement with the first engagement projection 23a is released.

Also, the first engagement holes 13a in the first fixing members 13 of the cluster panel 10 may be formed as indentations rather than through holes, and therefore the engagement strength between the first engagement holes and the first engagement projections 23*a* of the front case 20 may be controlled to a low level.

Further, in the in-vehicle apparatus mounting unit 101 according to this embodiment, the front case 20 is fixed to the cluster panel 10, but the present invention is not limited thereto. The front case 20 may be fixed to the rear case 30 instead.

Additionally, in the in-vehicle apparatus mounting unit 101 according to this embodiment, the fixing pins 15 for fixing the in-vehicle apparatus mounting unit 101 to the instrument panel 1 are provided on the design panel portion 11 of the cluster panel 10, but the present invention is not limited thereto. The fixing pins 15 may be provided integrally with the cylindrical portion 12 of the cluster panel 10 or the rear case 30 instead. By providing the fixing pins 15 on the bottom portion 31 of the rear case 30, a lateral width dimension of the in-vehicle apparatus mounting unit 101 seen from the driver's seat side can be reduced.

Also, in the in-vehicle apparatus mounting unit 101 according to this embodiment, the guide frames 34 fitted to the guide members 24 of the front case 20 are provided on the rear case 30, but the present invention is not limited thereto. The guide frames 34 may be provided on the cluster panel 10 instead.

Further, the in-vehicle apparatus mounting unit 101 according to this embodiment is not limited to a heater control panel, and may be applied to any component that includes a projection which the head or the like of a passenger may strike during a vehicle collision or the like.

The in-vehicle apparatus mounting unit 101 according to this embodiment may also be provided in front of a rear passenger seat of the vehicle as well as the driver's seat. Moreover, the in-vehicle apparatus mounting unit 101 according to this embodiment is not limited to a passenger car, and may be provided in other moving means for carrying people, such as trucks, trains, ships, or airplanes.

EXPLANATION OF REFERENCE NUMERALS

10 cluster panel
13*a* first engagement hole (fixing means)
13*c* slit
14*a* second engagement hole (case fixing means)
20 front case (support)
21*a* temperature adjustment switch (projection, in-vehicle apparatus)
21*b* air volume adjustment switch (projection, in-vehicle apparatus)
21*c*-21*f* switches (in-vehicle apparatus)
23*a* first engagement projection (fixing means)
30 rear case (support case)
30*a* space
32*a* second engagement projection (case fixing means)
34 guide frame (guide)
101 in-vehicle apparatus mounting unit

The invention claimed is:

1. An in-vehicle apparatus mounting unit having a projection that projects into a cabin interior, comprising:
   a panel provided to face the cabin interior;
   a support for supporting the projection while the projection is made to project into the cabin interior from the panel; and
   a support case attached to a side of the panel that is opposite of the cabin interior, the support case accommodating the support in a space formed thereby together with the panel,
   wherein the support is fixed to the panel or the support case by fixing means, and
   the fixing means releases fixation for the support when a load pushing the projection toward the panel exceeds a predetermined load.

2. The in-vehicle apparatus mounting unit according to claim 1, further comprising a case fixing means for fixing the support case to the panel, wherein a fixing strength of the fixing means is lower than a fixing strength of the case fixing means.

3. The in-vehicle apparatus mounting unit according to claim 1, wherein the fixing means fixes the support by engagement of an engagement projection.

4. The in-vehicle apparatus mounting unit according to claim 3, wherein the fixing means fixes the support by engaging the engagement projection with an engagement hole formed in a member,
   the engagement hole includes a slit extending from a peripheral edge thereof, and
   a strength of the member in which the engagement hole is formed is reduced around the engagement hole by the slit.

5. The in-vehicle apparatus mounting unit according to claim 1, wherein a guide for guiding movement of the support through the space is provided on the panel or the support case.

6. The in-vehicle apparatus mounting unit according to claim 1, wherein the support is fixed to the panel by the fixing means.

* * * * *